(12) United States Patent
Zhang et al.

(10) Patent No.: US 11,758,240 B2
(45) Date of Patent: Sep. 12, 2023

(54) INTEGRATED VIDEO AND DATA SYSTEM (71) Applicant: AVAGO TECHNOLOGIES INTERNATIONAL SALES PTE. LIMITED, Singapore (SG)

(72) Inventors: Weimin Zhang, San Jose, CA (US); Yong Li, San Diego, CA (US); Xuemin Chen, Rancho Santa Fe, CA (US); Charlie Lei Lou, Poway, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 251 days.

(21) Appl. No.: 16/557,496

(22) Filed: Aug. 30, 2019

(65) Prior Publication Data
US 2020/0092615 A1 Mar. 19, 2020

Related U.S. Application Data (60) Provisional application No. 62/731,046, filed on Sep. 13, 2018.

(51) Int. Cl.
*H04N 21/647* (2011.01)
*H04L 12/46* (2006.01)
*H04L 12/28* (2006.01)
*H04L 12/66* (2006.01)

(52) U.S. Cl.
CPC ... *H04N 21/64707* (2013.01); *H04L 12/2801* (2013.01); *H04L 12/4633* (2013.01); *H04L 12/66* (2013.01); *H04N 21/64738* (2013.01); *H04N 21/64761* (2013.01)

(58) Field of Classification Search
CPC ....... H04N 21/64707; H04N 21/64761; H04N 21/64738; H04L 12/4633
See application file for complete search history.

(56) References Cited

U.S. PATENT DOCUMENTS

| | | | |
|---|---|---|---|
| 5,200,978 | A | 4/1993 | Lo et al. |
| 2001/0030785 | A1 | 10/2001 | Pangrac et al. |
| 2002/0126685 | A1 | 9/2002 | Leatherbury et al. |
| 2006/0168612 | A1 | 7/2006 | Chapman et al. |
| 2006/0203844 | A1* | 9/2006 | Knittle .............. H04B 10/272 370/466 |

(Continued)

FOREIGN PATENT DOCUMENTS

| | | |
|---|---|---|
| CN | 1171178 | 1/1998 |
| CN | 104041014 | 9/2014 |

(Continued)

*Primary Examiner* — Jefferey F Harold
*Assistant Examiner* — Franklin S Andramuno (57) ABSTRACT

A system for integrating video content and data provision includes an upstream signal path to process upstream data traffic received from a first transmission network for transmission to a second transmission network, and a downstream signal path to process downstream data traffic and downstream video traffic for transmission from the second transmission network to the first transmission network. The upstream signal path includes an analog-to-digital converter (ADC) and an upstream demodulator, and the downstream signal path includes an Ethernet processor, a digital-signal-processor (DSP) and a digital-to-analog converter (DAC).

13 Claims, 8 Drawing Sheets

(56) References Cited

U.S. PATENT DOCUMENTS

| | | | | |
|---|---|---|---|---|
| 2009/0168713 | A1* | 7/2009 | Shao | H04W 16/14 |
| | | | | 370/329 |
| 2010/0158480 | A1* | 6/2010 | Jung | H04N 5/913 |
| | | | | 386/252 |
| 2011/0138434 | A1* | 6/2011 | Ulm | H04N 21/6377 |
| | | | | 725/114 |
| 2013/0007285 | A1* | 1/2013 | Li | H04L 65/1066 |
| | | | | 709/227 |
| 2017/0359600 | A1 | 12/2017 | Rea Zanabria et al. | |
| 2017/0359602 | A1* | 12/2017 | Rea Zanabria | H04B 10/25751 |
| 2018/0076771 | A1* | 3/2018 | Gomez | H03F 3/45183 |
| 2019/0082204 | A1* | 3/2019 | Surcouf | H04N 21/23611 |
| 2021/0135707 | A1* | 5/2021 | Tsiaflakis | H04B 3/487 |

FOREIGN PATENT DOCUMENTS

| | | |
|---|---|---|
| CN | 10475423 | 7/2015 |
| WO | WO 2018/114737 | 6/2018 |

\* cited by examiner

INTEGRATED VIDEO AND DATA SYSTEM

CROSS-REFERENCE TO RELATED APPLICATIONS

This application claims the benefit of priority under 35 U.S.C. § 119 from U.S. Provisional Patent Application 62/731,046 filed Sep. 13, 2018, which is incorporated herein by reference in its entirety.

TECHNICAL FIELD

The present description relates in general to content distribution systems, and more particularly to, for example, without limitation, integrated video and data systems.

BACKGROUND

As population densities increase in urban areas, broadband service providers are moving fiber-optic network endpoints closer to buildings (or areas) that are associated with high population densities, such as into the basements of multi-dwelling units. For example, a broadband service provider may place fiber-optic network endpoints, such as optical network terminals (ONTs), in the basements of large high-rise apartment buildings that include several apartments. The broadband service provider's headend may include an optical line terminal (OLT) that is communicatively coupled to the ONTs, for example, via fiber optic cables. The ONTs may be individually coupled, via a nonoptical network medium, such as a coaxial transmission line, to gateway devices that are located in, and provide broadband service (e.g. television, telephone, and/or Internet) to, user devices in the individual dwelling units. The user devices may include, for instance, set-top boxes, mobile phones, tablet devices or other communication devices. Thus, the ONTs may each include, and/or may be coupled to, a media converter that transforms optical signals received over the fiber-optic network from the OLT of the headend to electric signals that can be transmitted over the nonoptical network medium (such as coax cable) to the gateways in the individual dwelling units, and vice versa.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to an integrated video and data system. The disclosed integrated video and data system addresses both two-way data service and broadcast video services. The subject technology introduces a device concept for delivering high-quality broadcast programs such as $4k$ and $8k$ content through broadcast video channels. In the disclosed approach, an integrated device is employed as a headend server for both data service and broadcast controlled and managed under a unified management system.

Figure 1:
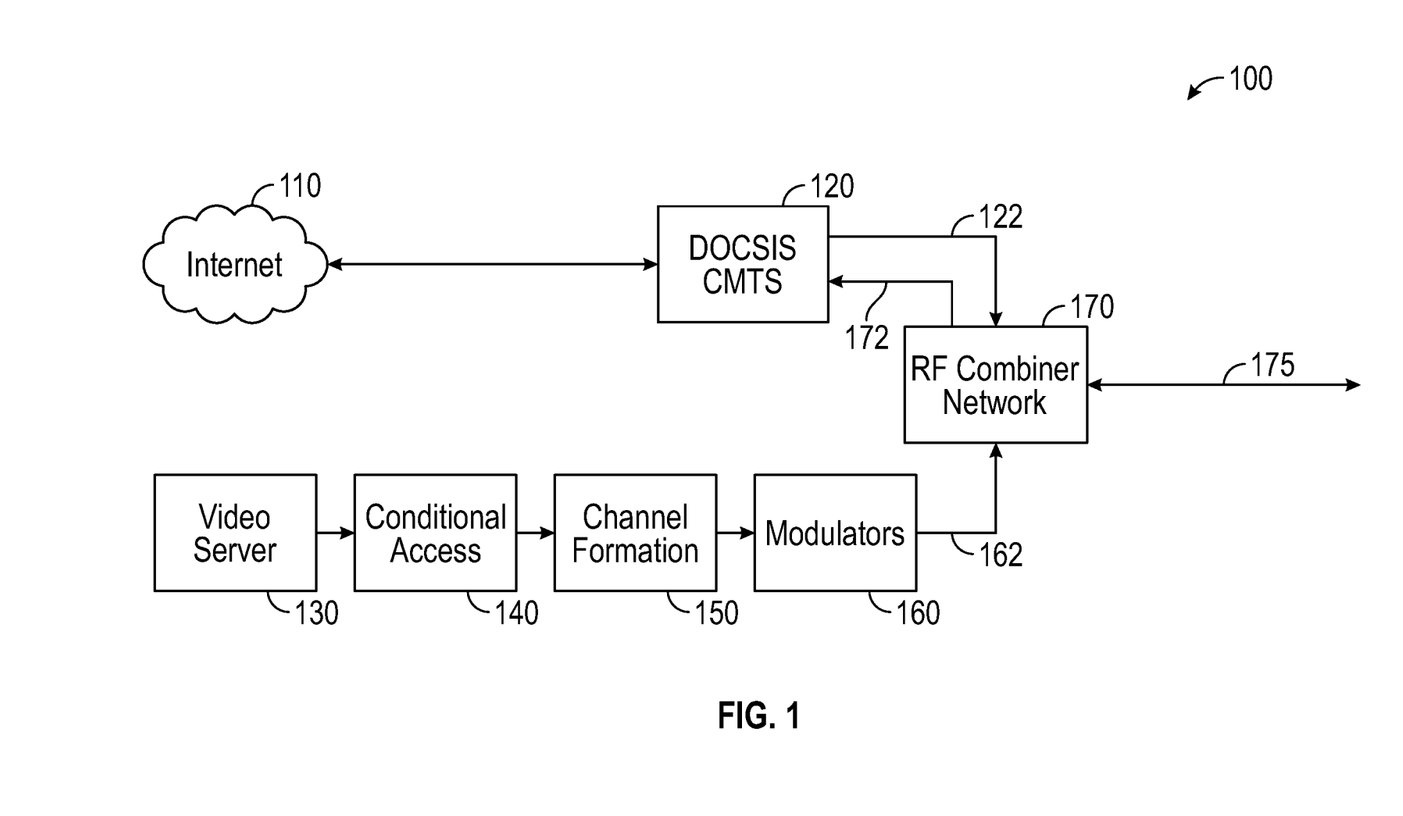
FIG. 1 illustrates an example environment in which a content distribution system may be implemented.

FIG. 1 illustrates an example environment 100 in which a content distribution system may be implemented. The environment 100 includes a network 110 such as the Internet, a data-over-cable system interface specification (DOCSIS) cable-modem transmission system (CMTS) 120, a video server 130, a conditional access module 140, a channel formation module 150, a modulator 160 and a radio-frequency (RF) combiner network 170. DOCSIS is a two-way data communication protocol that offers the possibility of a variety of services. Due to the DOCSIS two-way nature and capability of real time interaction, many data services provided through DOCSIS data network have fewer timing issues as compared with video broadcast services. The DOCSIS CMTS 120 (hereinafter "CMTS 120") operates as a two-way DOCSIS headend equipment that provides two-way data services for data applications, such as internet browsers and web conferencing of end-user devices. The CMTS 120 provides a spectrum with a number of channels, as explained later.

The video server 130 is a video broadcast system that is traditionally a one-way distribution network for broadcasting video and/or audio programs. In some implementations, the video server 130 may utilize narrowband or wide-band communication system as return channel to obtain end-user information to further optimize the network utilization. Each video and/or audio program consists of one of multiple moving-picture experts group (MPEG) transport streams. The MPEG content can be protected through various conditional access systems with timing sensitive encryption mechanisms. Timing synchronization is critical between MPEG transport streams for programs and timing sensitive encryption information corresponding to the programs. A number of MPEG transport streams are combined to form a channel. Each channel can occupy a 6-8 MHz frequency band on the cable plant to deliver a raw data rate of 28 to 50 Mbps. Each broadcast program (video or audio) is limited to one of the channels, and each channel may contain more than one broadcast program. The bit rate required for each broadcast video program tends to vary drastically due to compression and video quality; hence, some null packets are added to keep a constant bit rate per channel, and those null packets are considered as wasted bandwidth. The raw data of each channel is then converted to one RF band through various digital and analog circuitries. The broadcast video quality is sometimes limited by the total bandwidth available within each individual channel, especially for high-quality videos such as live sports in the 8K format.

The conditional access module 140 may include logic, processing circuitry, firmware and/or software for protecting content, for example, by using timing-sensitive encryption mechanisms. Timing synchronization is critical between MPEG streams of a program and timing-sensitive encryption information for that program. The channel formation module 150 may include logic, processing circuitry, firmware and/or software for converting raw data of each channel to one RF band. The channel formation module 150 may dynamically assign content to a particular channel based on information from an end-user request feed through a phone or other communication devices. The modulator 160 may include logic, processing circuitry, firmware and/or software for modulating baseband signals on to carrier signals using amplitude, frequency or phase modulation to generate a broadcast RF signal 162. The RF combiner network 170 may include logic, processing circuitry, firmware and/or software for combining the RF data signal 122 provided by the CMTS 120 and the broadcast RF signal 162 to provide a downstream data and video content which is part of a stream 175. The stream 175 further includes upstream data uploaded by end-user devices (e.g., set-top-boxes (STBs), computers, tablets, or other hand-held communication devices), and is delivered, as the upstream data 172, to the CMTS 120. Return channel may carry end-user broadcast video service information back to server to perform network optimization or service configuration.

Figure 2A:
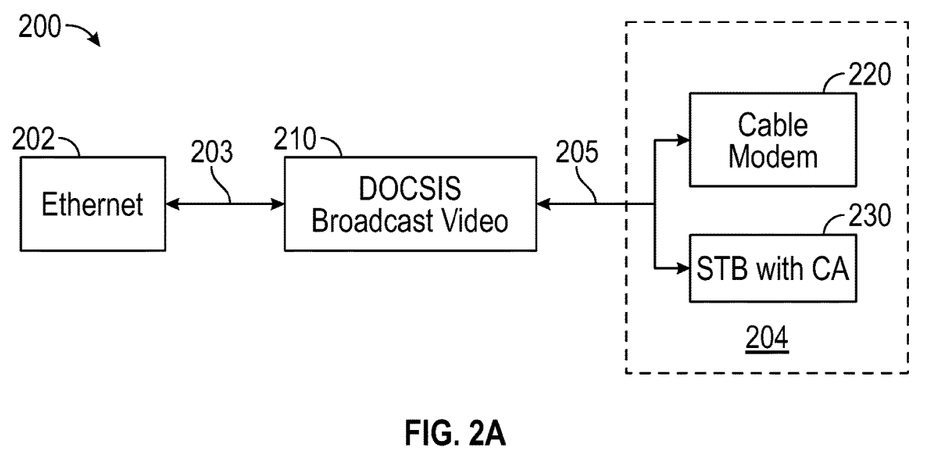
FIG. 2A is a high-level block diagram of an example of an integrated video and data system, in accordance with one or more implementations of the subject technology.

FIG. 2A is a high-level block diagram of an example of an integrated video and data system 200, in accordance with one or more implementations of the subject technology. The integrated video and data system 200 includes a DOCSIS and broadcast-video block 210 that is coupled, via a first transmission medium 203, to a first transmission network 202, including, but not limited to, an Ethernet network. The DOCSIS and broadcast-video block 210 is also coupled, via a second transmission medium 205 to a second transmission network 204 including modems (e.g., cable modems) 220 and STBs such as STBs with conditional access (CA) 230. The first transmission medium 203 and the second transmission medium 205 include coaxial cables (also referred to as a "cable plant") and/or fiber optics. The DOCSIS and broadcast-video block 210 includes an upstream signal path to process upstream data traffic received by the first transmission network 202 for transmission to the second transmission network 204, and a downstream signal path that processes downstream data traffic and downstream video traffic for transmission to the second transmission network 204, as will be discussed in more detail herein.

Figure 2B:
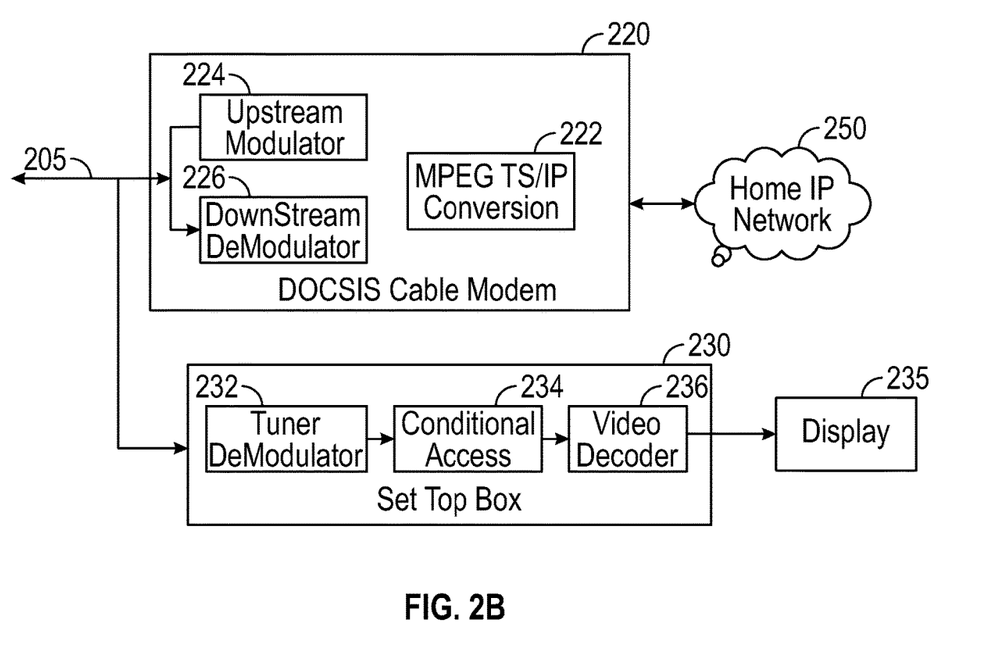
FIG. 2B is a block diagram of example implementations of the modem and the set-top box of FIG. 2A, in accordance with one or more implementations of the subject technology.

FIG. 2B is a block diagram of example implementations of the modem 220 and the STB 230 of FIG. 2A, in accordance with one or more implementations of the subject technology. The modem 220 can be a cable modem or an optical-network terminal (ONT) and is coupled to a network 250, such as a home IP network or other IP networks (e.g., Wi-Fi). The modem 220 includes am MPEG transport stream (TS) and/or IP conversion module 222, an upstream modulator 224 and a downstream demodulator 226, which are known modules and may include logic, processing circuitry, firmware and/or software for tuning upstream data received from the end-user devices such as consumer-premise equipment (CPE) connected to the network 250 device to DOCSIS bandwidth, and for transmitting downstream data, through the network 250, to end-user devices.

A number of cable modems, such as the modem 220, and CPEs, such as the STB 230, are connected via a cable plant 205 to the DOCSIS and broadcast-video block 210. For broadcast video, the STB 230 is generally utilized to receive the content and display it on a display device 235 such as a television (TV). The STB 230 includes, but is not limited to, a tuner/demodulator 232, a conditional access engine 234 and a video decoder 236. The tuner/demodulator 232 can select one RF channel from the cable plant 205, and convert the download stream (RF signal) to digital content (bits). The conditional access engine 234 can descramble/decrypt the digital content for an authorized end-user (e.g., a CPE). The video decoder 236 can decode the compressed video contents and send to the display device 235 (e.g., a TV).

Figure 3:
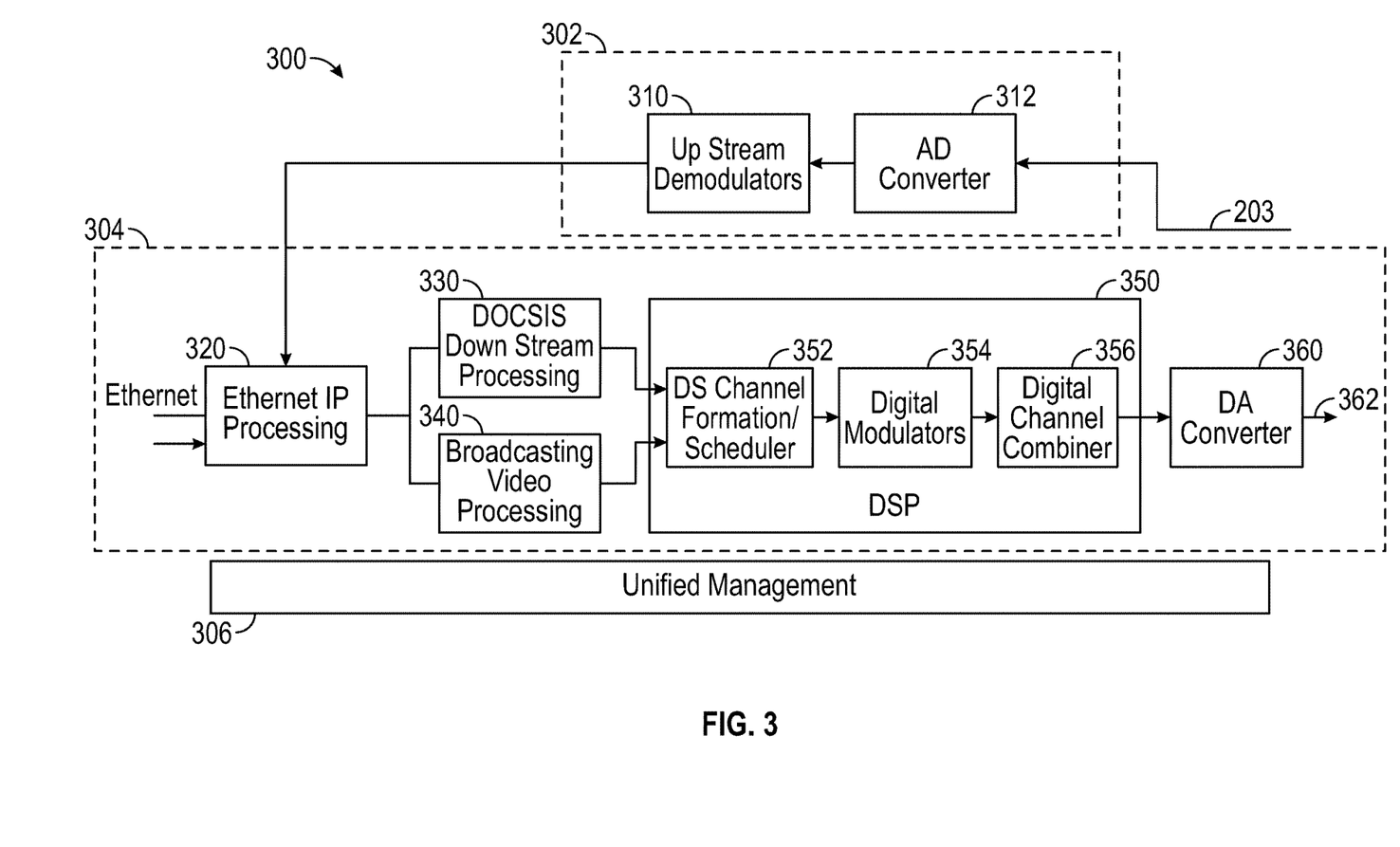
FIG. 3 is a schematic diagram illustrating an example of an integrated content distribution system, in accordance with one or more implementations of the subject technology.

FIG. 3 is a schematic diagram illustrating an example of an integrated content distribution system 300, in accordance with one or more implementations of the subject technology. The integrated content distribution system 300 (hereinafter "distribution system 300") is an integrated device (e.g., chip such as a semiconductor chip) and can be employed as a headend server for both data service and video broadcast, under control of a unified management unit 306. The distribution system 300 is connected to a backbone server (not shown for simplicity) through one of multiple Ethernet connections via an Ethernet IP processor 320. The distribution system 300 includes an upstream signal path 302 and a downstream signal path 304 that are coupled to the Ethernet IP processor 320. The upstream signal path 302 includes, but is not limited to, an analog-to-digital converter (ADC) 312 (e.g., a high-speed ADC), an upstream demodulator 310 and other RF circuitry (not shown for simplicity). The ADC 312 receives upstream analog data from the cable plant 205 of FIG. 2A and converts the analog upstream data to upstream digital data for further processing by the upstream demodulator 310, which can demodulate the upstream digital data to DOCSIS upstream data.

The downstream signal path 304 includes the Ethernet IP processor 320, a DOCSIS downstream processor 330, a broadcast video processor 340, a digital-signal-processor (DSP) 350 and a digital-to-analog converter (DAC) 360. The DOCSIS downstream processor 330 may include logic, processing circuitry, firmware and/or software for processing to comply with the DOCSIS protocol. For example, the DOCSIS downstream processor 330 performs an important function of separating various DOCSIS traffic into tiers based on timing requirement sensitivities. The DOCSIS downstream processor 330 also performs functionalities such as bandwidth control, de-jittering and other traditional DOCSIS functionalities.

The broadcast video processor 340 is employed to perform traditional MPEG TS processing requirements for each of the program streams provided by one or more video servers (e.g., 130 of FIG. 1). For example, the broadcast video processor 340 can split high-bandwidth streams into multiple sub-TS streams, where the peak rate of each sub-TS stream is smaller than the maximum bandwidth of original RF channel limitations. The broadcast video processor 340 can further remove network jitter, perform program clock reference (PCR) corrections and conditional access and other functionalities.

The DSP 350 includes a downstream channel formation and/or scheduler 352, a digital modulator 354 and a digital channel combiner 356. The downstream channel formation and/or scheduler 352 may include logic, processing circuitry, firmware and/or software for scheduling and positioning the packets from each individual video or DOCSIS stream in the entire available band. The scheme of arranging scheduled content in the available bandwidth is based on timing sensitivity, delay and jitter requirements, as well as other overall quality-of-service (QoS) attributes of the video and DOCSIS content. The QoS information of the content can be provided by the DOCSIS downstream processor 330 and the broadcast video processor 340. For example, broadcast video can be positioned into each channel's bandwidth with priority and mixed with some of the DOCSIS traffic, which is less time sensitive and may be used to fill the remaining available bandwidth. With this approach, traditional channel concepts still exist, and high-bandwidth broadcast content and DOCSIS content could spread over a few or the entire traditional channels. Channel concepts only exist for legacy devices. An important advantage of this approach is that the entire residual bandwidth (originally filled with null packets) would be utilized for some of the DOCSIS services. On the receiver side, a client device (e.g. cable modem or set-top box) is used to demodulate and separate the mixed video and DOCSIS packets in the downstream channels into their corresponding packet streams. In particular, a client device with full-bandwidth capability (e.g. with full-band capture tuner and demodulators) can be used to receive any video and DOCSIS content in any downstream channels.

The digital modulator 354 is a known block and may include logic, processing circuitry, firmware and/or software for modulating signals received from the downstream channel formation and/or scheduler 352. The modulated signals include DOCSIS CMTS output and at least one broadcast video RF output that are mixed by the digital channel combiner 356 to generate a digital RF downstream. The digital RF downstream is converted to an analog RF downstream via the DAC 360.

The unified management unit 306 may include logic, processing circuitry, firmware and/or software for controlling and managing operations of various modules and components of the upstream signal path 302 and downstream signal path 304.

Figure 4:
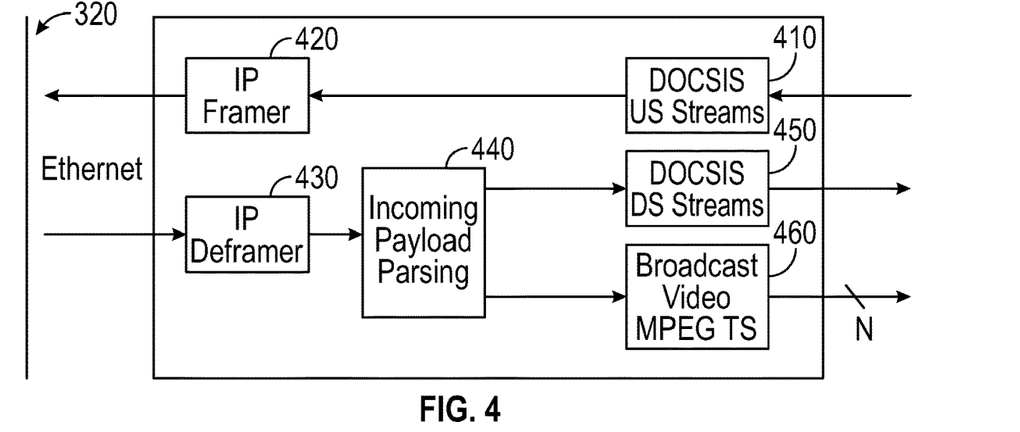
FIG. 4 is a schematic diagram illustrating an example of an Ethernet internet protocol processing system, in accordance with one or more implementations of the subject technology.

FIG. 4 is a schematic diagram illustrating an example of the Ethernet IP processor 320 of FIG. 3, in accordance with one or more implementations of the subject technology. The Ethernet IP processor 320 is connected to backbone server through one of multiple Ethernet connections and includes an upstream path, consisting of DOCSIS upstream receiver 410 and an IP framer 420, and a downstream path, including an IP deframer 430, a payload parser 440, a DOCSIS downstream interface 450 and a broadcast video (e.g., MPEG TS) module 460. The IP deframer 430, payload parser 440, DOCSIS downstream interface 450 and broadcast video module 460 each may include logic, processing circuitry, firmware and/or software. The DOCSIS upstream receiver 410 interfaces with the upstream demodulator 310 of FIG. 3 to receive DOCSIS upstream data and provide it to the IP framer 420. The IP framer 420 packages DOCSIS upstream data into IP frames, and sends to a backbone server via an Ethernet connection. The IP de-framer 430 strips off IP header from the IP frames received from the backbone server. The payload parser 440 can separate DOCSIS downstream data traffic and broadcast video traffic for further processing by the DOCSIS downstream processor 330 and broadcast video processor 340 of FIG. 3, respectively. The separated DOCSIS downstream data traffic and broadcast video traffic are delivered to the DOCSIS downstream processor 330 and broadcast video processor 340 via the DOCSIS downstream interface 450 and broadcast video module 460, respectively.

Figure 5:
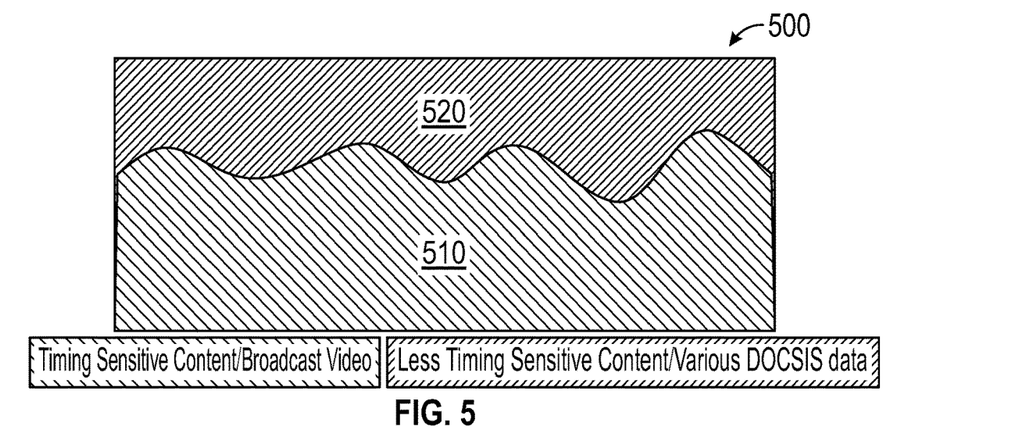
FIG. 5 is a schematic diagram illustrating an example of an integrated video and data channel content, in accordance with one or more implementations of the subject technology.

FIG. 5 is a schematic diagram illustrating an example of an integrated video and data channel content 500, in accordance with one or more implementations of the subject technology. The integrated video and data channel content 500 includes a timing-sensitive content 510 including broadcast video and a less-timing-sensitive content 520 including various DOCSIS data such as downstream DOCSIS data.

Figure 6:
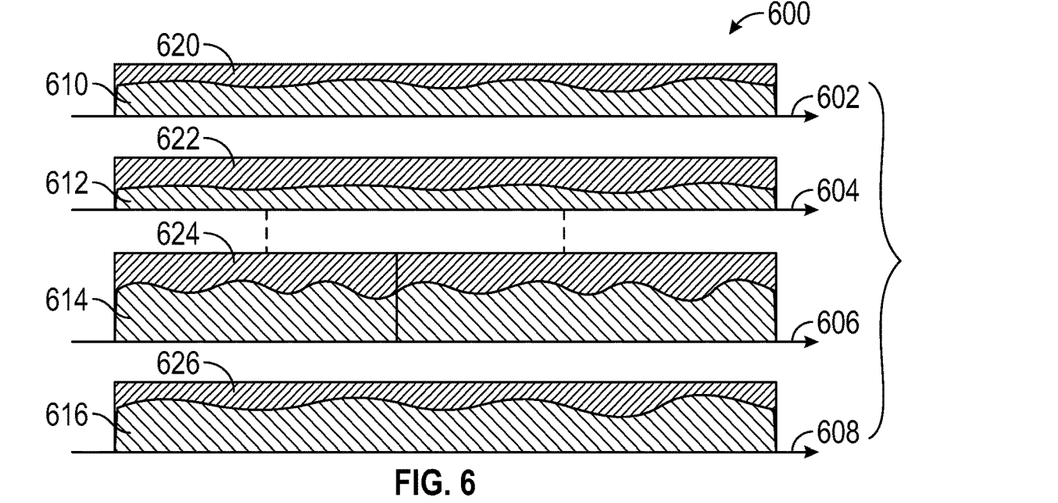
FIG. 6 is a schematic diagram illustrating an example of a video auxiliary channel, in accordance with one or more implementations of the subject technology.

FIG. 6 is a schematic diagram illustrating an example of a video auxiliary channel 600, in accordance with one or more implementations of the subject technology. It is understood that a complete video content can be delivered through multiple physical layer (PHY) channels. The video auxiliary channel 600 includes a number of channels such as video channels 602, 604, 606 and 608 that are separated by the PHY from a super-channel. The time-varying contents 610, 612, 614 and 616 and their corresponding less-time-varying contents and contents 620, 622, 624 and 626 of the video channels 602, 604, 606 and 608 are shown in FIG. 6.

Figure 7:
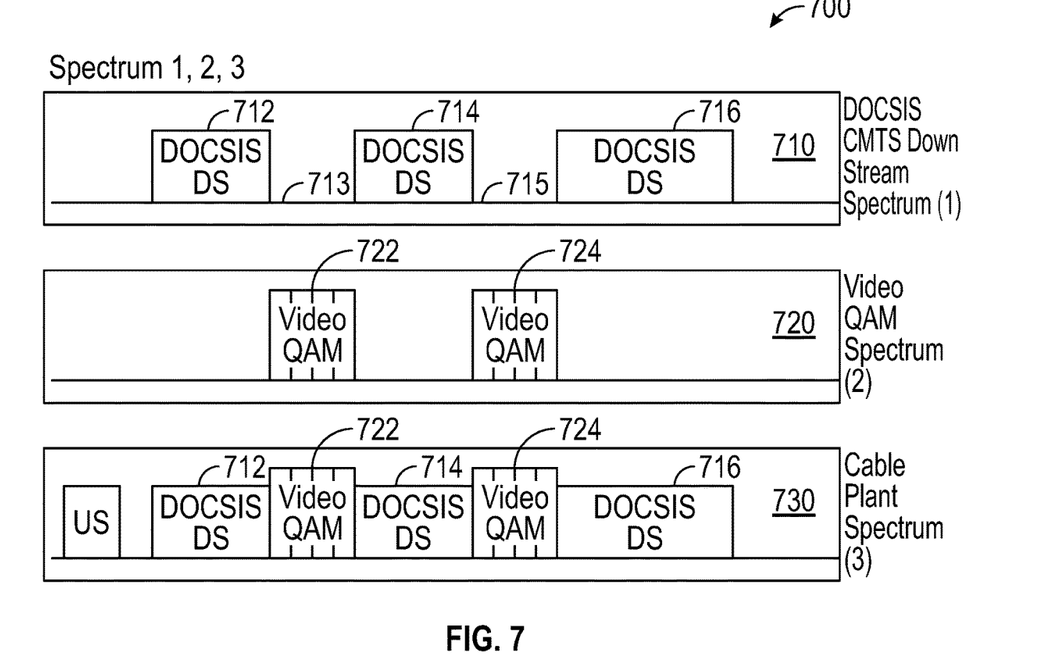
FIG. 7 is a schematic diagram illustrating examples of data, video content and cable plant spectra, in accordance with one or more implementations of the subject technology.

FIG. 7 is a schematic diagram illustrating examples data, video content and cable plant spectra 700, in accordance with one or more implementations of the subject technology. The examples data, video content and cable plant spectra 700 corresponds to the distribution system 300 of FIG. 3 and includes a DOCSIS CMTS downstream spectrum 710, a video quadrature amplitude modulation (QAM) spectrum 720 and a cable plant spectrum 730. The DOCSIS CMTS downstream spectrum 710 includes a number of DOCSIS downstream bands such as bands 712, 714 and 716 separated by two frequency intervals 713 and 715. The video QAM spectrum 720 includes QAM video bands 722 and 724 that are conveniently positioned in the frequency intervals 713 and 715 of the DOCSIS CMTS downstream spectrum 710. The cable plant spectrum 730 is the spectrum of the combined video content stream and DOCSIS downstream that is a combination of the DOCSIS CMTS downstream spectrum 710 and the video QAM spectrum 720 and is entirely filled with the DOCSIS downstream bands (712, 714 and 716) and the QAM video bands (722 and 724).

Figure 8:
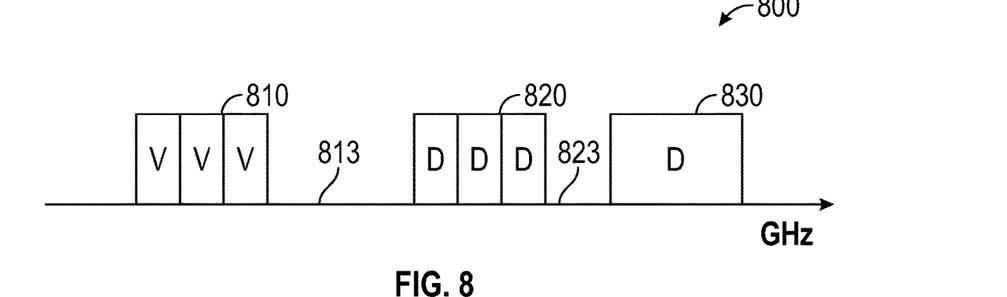
FIG. 8 is a schematic diagram illustrating an example of data and video content spectra.

FIG. 8 is a schematic diagram illustrating an example of data and video content spectrum 800. The example of data and video content spectrum 800 corresponds to a traditional data and video content system such as the content distribution system provided by the environment 100 of FIG. 1. As shown in FIG. 8, the frequency band 810 corresponding to the video content and the frequency bands 820 and 830 corresponding to DOCSIS data are separated by frequency intervals 813 and 823, which are wasted. This indicates that the integrated device of the subject technology (e.g., 300 of FIG. 3) is substantially more spectrum-efficient than the traditional system (e.g., 100 of FIG. 1).

Figure 9:
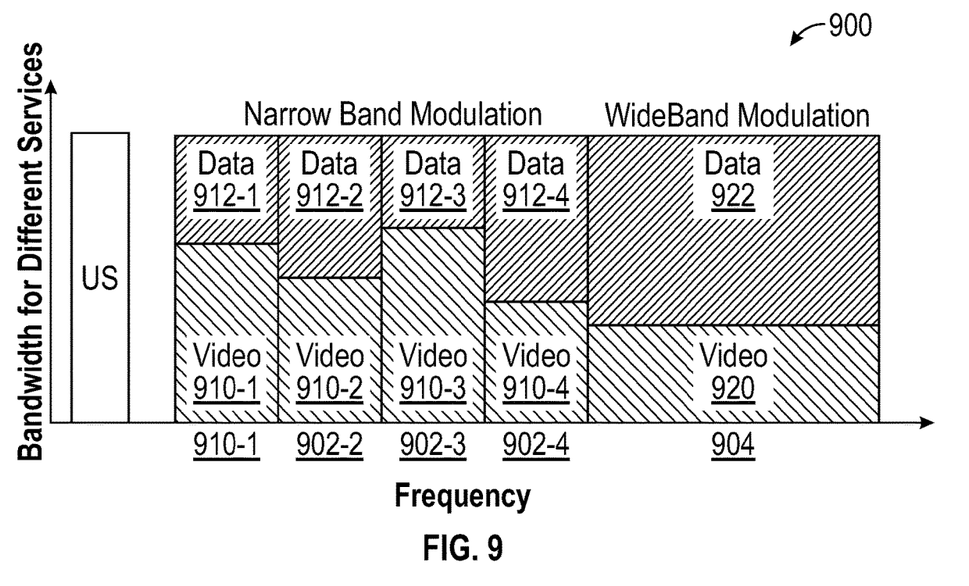
FIG. 9 is a schematic diagram illustrating an example of a broadcast video content and data service content frequency spectrum, in accordance with one or more implementations of the subject technology.

FIG. 9 is a schematic diagram illustrating an example of a broadcast video content and data service content frequency spectrum 900, in accordance with one or more implementations of the subject technology. The frequency spectrum 900 includes broadcast video content 910 (910-1, 910-2, 910-3 and 910-4) and DOCSIS data 912 (912-1, 912-2, 912-3 and 912-4) bandwidths for channels 902 (902-1, 902-2, 902-3 and 902-4) of a narrowband modulation scheme, as well as broadcast video content 920 and DOCSIS data 922 for a channel 904 of a wideband modulation scheme. The broadcast video content (e.g., 910 or 920) and DOCSIS data (e.g., 912 or 922) are co-existing in any of the downstream channels 902 or 904, regardless of the modulation scheme. In one or more implementations, the narrowband modulation scheme can be a narrowband QAM, and the wideband modulation scheme can be an orthogonal frequency-division multiplexing (OFDM) modulation scheme. For an end-user device, regardless of being a legacy device or a user device of the subject technology, the frequency based channelization is no longer a limitation for content bandwidth sensitive services. In the traditional approach, however, different services are separated by frequency assignment and frequency partition. For example, DOCSIS services are staying within assigned DOCSIS channels or frequency bands and the legacy broadband video services are limited by 6 or 8 MHz frequency bands.

Figure 10:
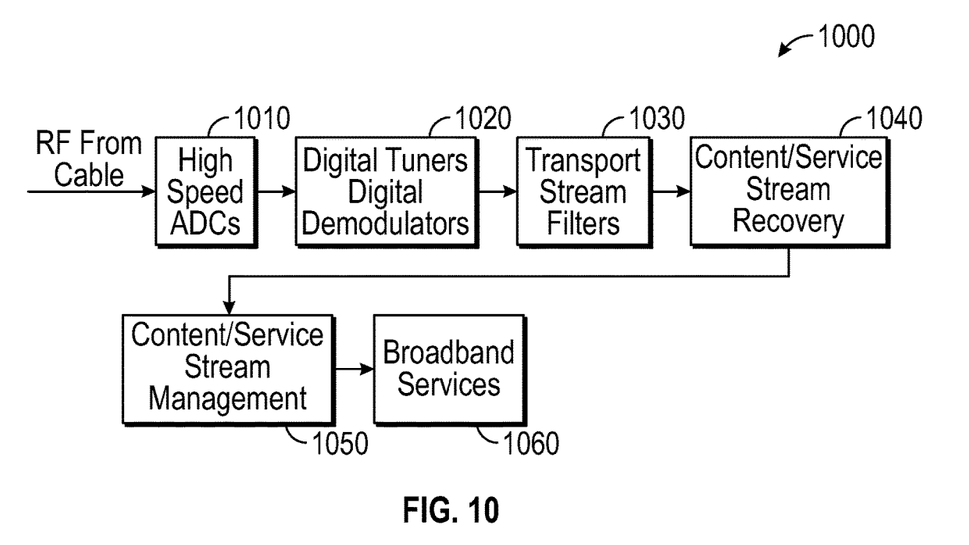
FIG. 10 is a schematic diagram illustrating an example implementation of a user device, in accordance with one or more implementations of the subject technology.

FIG. 10 is a schematic diagram illustrating an example implementation of a user device 1000, in accordance with one or more implementations of the subject technology. The user device 1000 includes one or more high-speed ADCs 1010, digital tuners and digital modulators 1020, transport stream filters 1030, a content and/or stream recovery module 1040 and a content and/or service stream management unit 1050 that provides broadband services 1060. The user device 1000 can recover information, without limitation, from frequency channelized RF system. The high-speed ADCs 1010 digitize wide frequency bands or entire bands, which contain multiple channelized RF systems based on frequency division, which may have different channel spacing and/or different modulation types. The digital tuners and digital demodulators 1020 can convert the digitized RF signals to mixed transport streams. For each particular service, one or more of the transport stream filters 1030 may be employed to select related sub-streams. The related sub-streams could be selected from different frequency channel with different modulations. The content/service steam recovery block 1040 can combine all the related streams for a particular service of interest. The recovered stream is no longer limited by RF channel frequency bandwidth or modulation types. Then the recovery content stream can be managed by the content and/or service stream management unit 1050 (e.g., either traditional one-way conditional access control systems or two-way communication systems for access control) for delivery of the content stream for the broadband services 1060.

Figure 11:
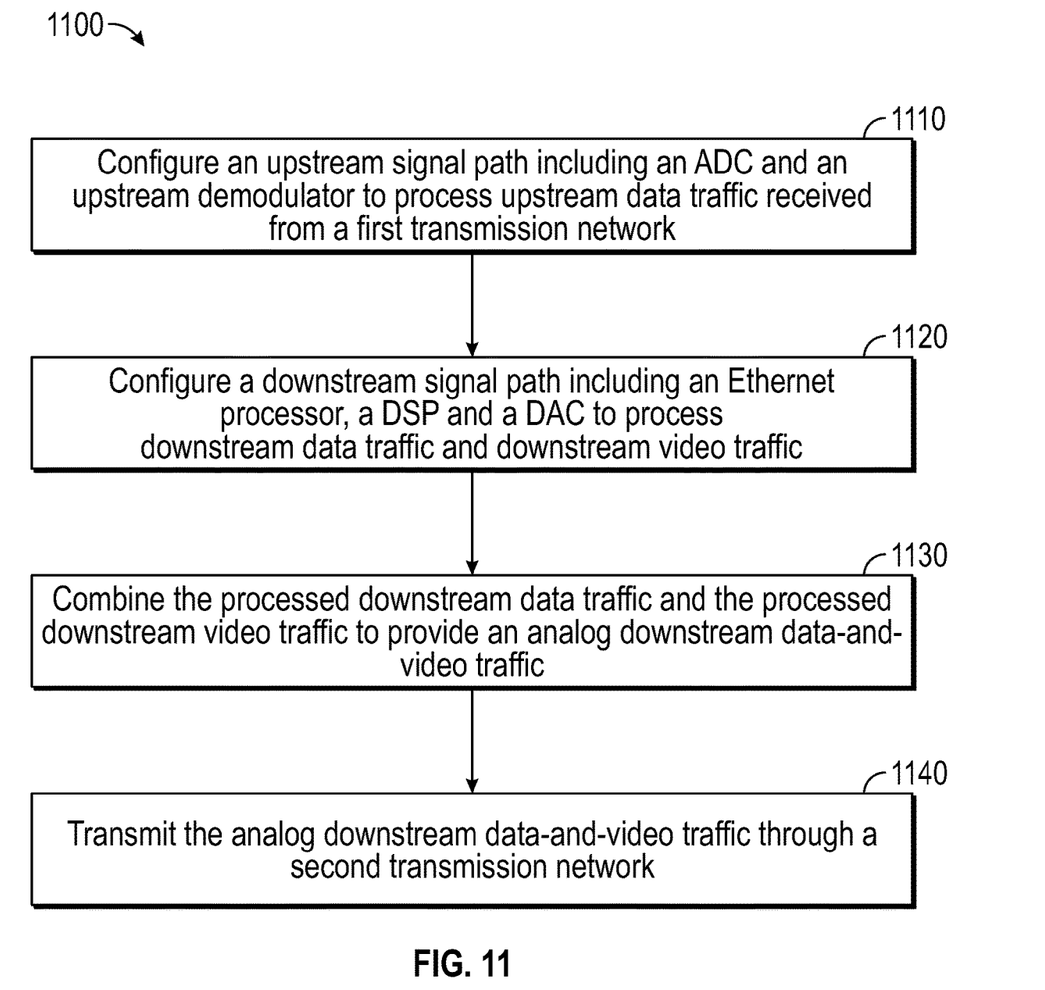
FIG. 11 is a flow diagram of an example of a method of integrating video content and data, in accordance with one or more implementations of the subject technology.

FIG. 11 is a flow diagram of an example of a method 1100 of integrating video content and data, in accordance with one or more implementations of the subject technology. The method 1100 includes configuring an upstream signal path (e.g., 302 of FIG. 3), consisting of an ADC (e.g., 312 of FIG. 3) and an upstream demodulator (e.g., 310 of FIG. 3), to process upstream data traffic received from a first transmission network (e.g., 202 of FIG. 2A) (1110). A downstream signal path (e.g., 304 of FIG. 3), including an Ethernet processor (e.g., 320 of FIG. 3), a DSP (e.g., 350 of FIG. 3) and a DAC (e.g., 360 of FIG. 3), is used to process downstream data traffic and downstream video traffic (1120). The processed downstream data traffic and the processed downstream video traffic are combined (e.g., via 356 of FIG. 3) to provide an analog downstream data-and-video traffic (e.g., 362 of FIG. 3) (1130). The analog downstream data-and-video traffic is transmitted to users through a second transmission network (e.g., 204 of FIG. 2) (1140).

Figure 12:
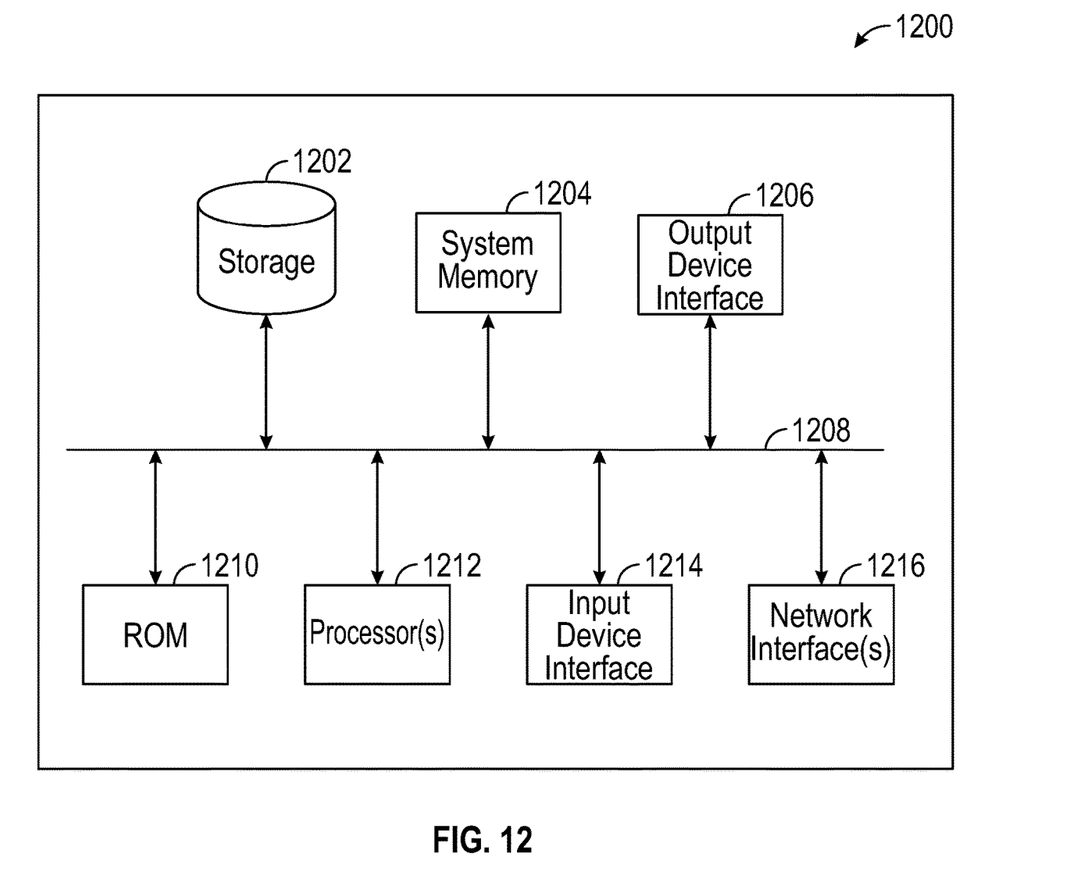
FIG. 12 conceptually illustrates an electronic system with which any implementations of the subject technology can be implemented.

FIG. 12 conceptually illustrates an electronic system with which any implementations of the subject technology are implemented. The electronic system 1200, for example, can be a network device, an STB device, a media converter, a desktop computer, a laptop computer, a tablet computer, a server, a switch, a router, a base station, a receiver, a phone, or generally any electronic device that transmits signals over a network. Such an electronic system 1200 includes various types of computer-readable media and interfaces for various other types of computer-readable media. In one or more implementations, the electronic system 1200 may perform some of the functionalities of the integrated device (e.g., 300 of FIG. 3) of the subject technology, for example, executing one or more software modules of the distribution system 300. The electronic system 1200 includes a bus 1208, one or more processing units 1212, a system memory 1204, a read-only memory (ROM) 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing units 1212 with the ROM 1210, the system memory 1204, and the permanent storage device 1202. From these various memory units, the one or more processing units 1212 retrieve instructions to execute and data to process in order to execute the processes of the subject disclosure. The one or more processing units 1212 can be a single processor or a multi-core processor in different implementations. In one or more implementations, one or more processing units 1212 may perform some of the processing functionalities of the distribution system 300 of the subject technology by executing respective software modules.

The ROM 1210 stores static data and instructions that are needed by the one or more processing units 1212 and other modules of the electronic system. The permanent storage device 1202, on the other hand, is a read-and-write memory device. The permanent storage device 1202 is a nonvolatile memory unit that stores instructions and data even when the electronic system 1200 is off. One or more implementations of the subject disclosure use a mass-storage device (such as a magnetic or optical disk and its corresponding disk drive) as the permanent storage device 1202.

Other implementations use a removable storage device (such as a floppy disk or a flash drive, and its corresponding disk drive) as the permanent storage device 1202. Like the permanent storage device 1202, the system memory 1204 is a read-and-write memory device. However, unlike the permanent storage device 1202, the system memory 1204 is a volatile read-and-write memory, such as random-access memory (RAM). System memory 1204 stores any of the instructions and data that the one or more processing units 1212 need at runtime. In one or more implementations, the processes of the subject disclosure are stored in the system memory 1204, the permanent storage device 1202, and/or the ROM 1210. From these various memory units, the one or more processing units 1212 retrieve instructions to execute and data to process in order to execute the processes of one or more implementations.

The bus 1208 also connects to the input device interface 1214 and the output device interface 1206. The input device interface 1214 enables a user to communicate information and select commands to the electronic system 1200. Input devices used with the input device interface 1214 include, for example, alphanumeric keyboards and pointing devices (also called "cursor control devices"). The output device interface 1206 enables, for example, the display of images generated by the electronic system 1200. Output devices used with the output device interface 1206 include, for example, printers and display devices, such as a liquid crystal display (LCD), a light-emitting diode (LED) display, an organic light-emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual, auditory, or tactile feedback, and input from the user can be received in any form, including acoustic, speech, or tactile input.

Finally, as shown in FIG. 12, the bus 1208 also couples the electronic system 1200 to one or more networks (not shown) through one or more network interfaces 1216. In this manner, the computer can be a part of one or more networks of computers (such as LAN, a wide area network (WAN), an Intranet, or a network of networks, such as the Internet). Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium can also be nontransitory in nature.

The computer-readable storage medium can be any storage medium that can be read, written, or otherwise accessed by a general-purpose or special-purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any nonvolatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any nonsemiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or nonexecutable machine code or as instructions in a high-level language that can be compiled to produce executable or nonexecutable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can differ significantly without varying the underlying logic, function, processing, and output.

While the above discussion primarily refers to microprocessor or multicore processors that execute software (SW), one or more implementations are performed by one or more integrated circuits, such as application-specific integrated circuits (ASICs) or field programmable gate arrays (FPGAs). In one or more implementations, such integrated circuits execute instructions that are stored on the circuits themselves.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "an example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A system for integrating video content and data provision, the system comprising:
    an upstream signal path configured to process an upstream data traffic received from a first transmission network for transmission to a second transmission network; and
    a downstream signal path configured to process a downstream data traffic and downstream video traffic for transmission over downstream frequency channels from the second transmission network to the first transmission network,
    wherein:
    the upstream signal path includes an analog-to-digital converter (ADC) and an upstream demodulator;
    the downstream signal path includes an Ethernet processor, a digital-signal-processor (DSP) and a digital-to-analog converter (DAC);
    the downstream data traffic comprises a downstream first data;
    the downstream video traffic comprises a downstream video content; and
    the DSP comprises at least a digital channel combiner configured to combine the downstream first data and the downstream video content to allow the downstream first data and the downstream video content to co-exist in i) at least one of a narrowband modulation scheme or a wideband modulation scheme and ii) a single downstream channel of the downstream frequency channels.

2. The system of claim 1, wherein the upstream data traffic comprises a data-over-cable system interface specification (DOCSIS) data stream.

3. The system of claim 1, wherein the first transmission network comprises at least one of a coaxial cable network or a fiber-optics network, and wherein the second transmission network comprises an Ethernet network.

4. The system of claim 1, wherein the upstream demodulator comprises a DOCSIS demodulator configured to demodulate the upstream data traffic for Ethernet processing.

5. The system of claim 4, wherein the Ethernet processor comprises a DOCSIS upstream receiver configured to receive the demodulated upstream data traffic and to provide DOCSIS upstream content to an internet protocol (IP) framer for conversion to IP frames.

6. The system of claim 4, wherein the Ethernet processor further comprises an IP defamer, a payload parser, a DOCSIS downstream interface and a video stream interface, and wherein the payload parser is configured to parse payloads of deframed IP frames to provide DOCSIS downstream data and a video data stream to the DOCSIS downstream interface and the video stream interface, respectively.

7. The system of claim 6, wherein the downstream signal path further includes a DOCSIS downstream processor configured to process the DOCSIS downstream data by performing DOCSIS functions including bandwidth control and de-jittering.

8. The system of claim 6, wherein the downstream signal path further includes a broadcast video processor configured to process the video data stream by performing moving-picture experts group (MPEG) transport stream processing including removing network jitter a well as performing program clock reference (PCR) corrections and conditional access.

9. The system of claim 6, wherein the DSP comprises a downstream channel formation and scheduler, a digital modulator and a digital channel combiner configured to combine the video data stream and the DOCSIS downstream data.

10. The system of claim 1, further comprising a system management unit configured to unify management and control of operations of the upstream signal path and the downstream signal path.

11. A content distribution system comprising:
    at least one processor circuit configured to:
        process upstream data traffic received from a first transmission network through an upstream signal path for transmission to a second transmission network; and
        process downstream data traffic and downstream video traffic through a common downstream signal path for transmission over downstream frequency channels to the first transmission network,
    wherein:
    at least one of the downstream data traffic or the downstream video traffic is receivable from the second transmission network;
    the downstream data traffic comprises a downstream first data;
    the downstream video traffic comprises a downstream video content; and
    the common downstream signal path is configured to combine the downstream first data and the downstream video content to allow the downstream first data and the downstream video content to co-exist in i) at least one of a narrowband modulation scheme or a wideband modulation scheme and ii) a single downstream channel of the downstream frequency channels.

12. The content distribution system of claim 11, wherein the second transmission network comprises an Ethernet network.

13. The content distribution system of claim 11, wherein the first transmission network comprises at least one of a coaxial cable network or an optical fiber network.

* * * * *